United States Patent Office 3,107,600
Patented Oct. 22, 1963

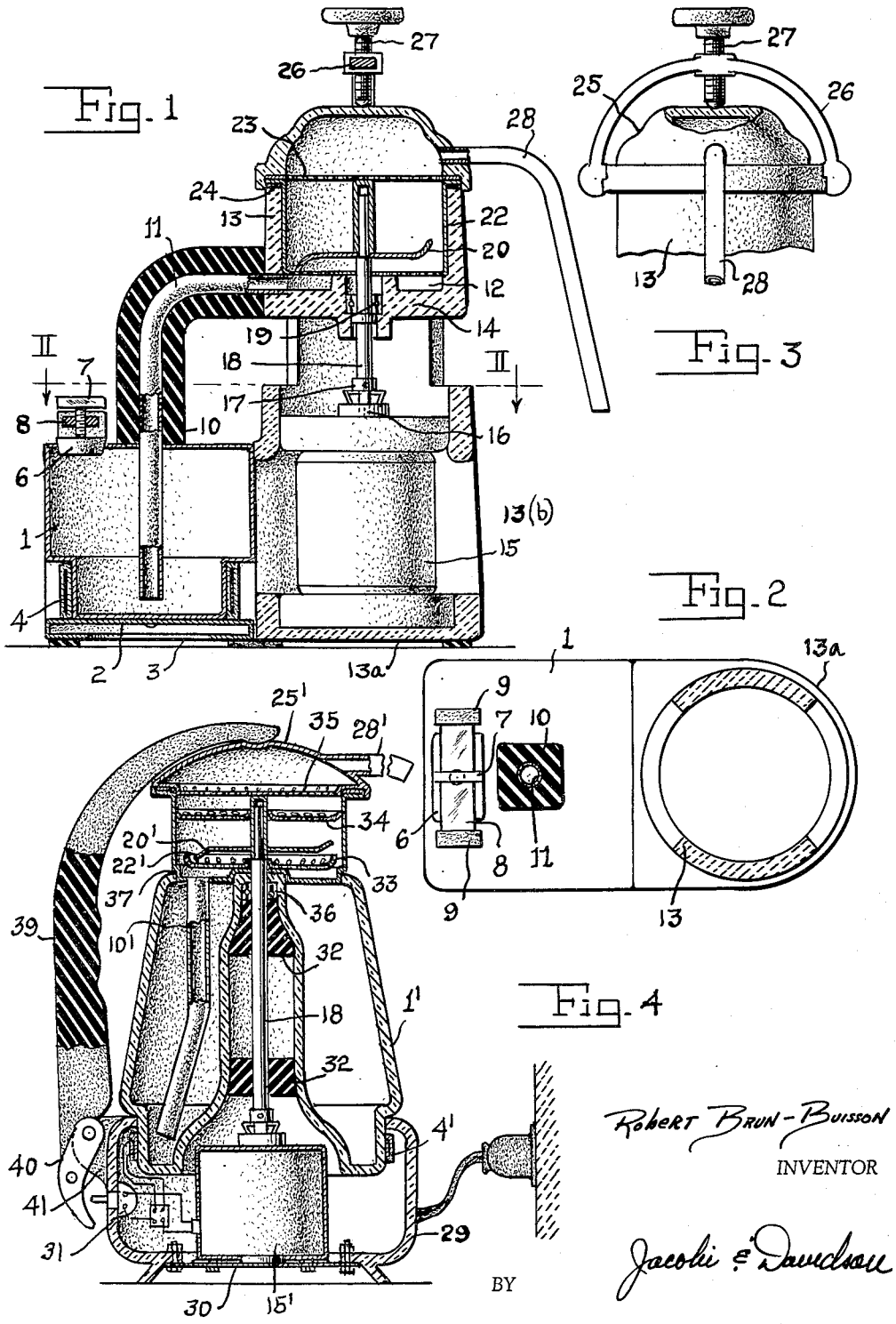

3,107,600
COMBINED COFFEE-POT AND COFFEE-MILL
Robert Brun-Buisson, Riouperoux, France, assignor, by mesne assignments, to Inventions Finance Corporation, a corporation of Delaware
Filed Oct. 6, 1960, Ser. No. 61,012
Claims priority, application France Oct. 15, 1959
14 Claims. (Cl. 99—286)

The present invention relates to a combination coffee-pot and coffee-mill.

The invention has for its object to provide a coffee-pot and mill in a single unit which enables the grinding of the coffee and the infusion of the ground coffee to be carried out simultaneously.

A further object of the invention is to provide a coffee-pot and mill housed in a single body and comprising an electric boiler and an infusion bowl coupled by a tube to the said boiler and constituting at the same time a filter and a coffee-mill actuated by an electric motor also housed in the same body.

Still a further object of the invention is to provide a coffee-pot and mill comprising an electric boiler and an electric motor housed in juxtaposition in a single body, on which is arranged an infusion bowl coupled by a tube to the said boiler and constituting at the same time a filter and a coffee-mill actuated by the said motor.

Another object of the invention is to provide a coffee-pot and mill comprising, superposed on a single body, an electric motor, an electric boiler and an infusion bowl coupled by a tube to the said bowl and constituting at the same time a filter and a coffee-mill actuated by the said motor.

Further details of construction will be brought out during the course of the description which follows below, reference being made to the accompanying drawings, in which:

FIG. 1 represents a cross-section of a first form of embodiment of the combined coffee-pot and coffee-mill;

FIG. 2 is a cross-section taken along the line II—II of FIG. 1, the motor being assumed to be removed;

FIG. 3 is a detail view illustrating the method of closure of the infusion bowl;

FIG. 4 represents a cross-section of an alternative form of construction of the coffee-pot and mill.

In a first form of embodiment shown in FIGS. 1 to 3, the coffee-pot forming the object of the present invention is constituted in the following way:

In the first place it comprises a boiler consisting of a receptacle 1, closed at its upper portion, and having a bottom 2 in the form of a dish, hermetically joined, for example by welding, to the vertical wall of the receptacle. The said wall is extended beyond the bottom 2 and forms a skirt closed by a second bottom 3.

The bottom 3 is removable so as to enable an electric resistance 4 to be fixed round the bottom 2, the resistance being supplied by means of electric conductors (not shown). A switch is preferably mounted on the lower part of the wall so as to permit the circuit of the resistance to be closed at will.

The receptacle 1 is provided with an opening 5 which enables a quantity of water, corresponding to the number of cups which it is desired to make, to be introduced into the receptacle 1. This opening is closed by a plug 6 held in position by means of a screw 7 passing through a bridge piece 8 engaging with two blocks 9 of insulating material fixed on the upper wall of the receptacle 1. The plug 6 can furthermore be fixed in any other known manner.

On the said upper wall of the receptacle 1 is also fixed a handle 10 of insulating material, inside which is housed a tube 11 which passes down inside the receptacle 1 and terminates at its upper extremity in a chamber 12 formed at the upper part of a cylindrical body 13 which is provided with a transverse central partition 14 and a base member 13a.

In the lower part of the body 13 is arranged an electric vertical shaft motor 15 mounted so as to be readily removed. The body 13 is provided with radial openings 13(b) to ensure the ventilation of the motor and which also reduce the weight of the coffee-pot combination.

The shaft 16 of the motor 15 is provided at its upper extremity with a coupling device 17 permitting rapid coupling of the shaft to a further shaft which carries accessories intended for various purposes. The same motor may thus also be used to actuate beaters, a mixer, a coffee-mill screw, etc.

In the case considered, the motor is placed in position so as to drive a shaft 18 which passes through the partition 14 by a packing gland 19 ensuring the fluid-tightness of the chamber 12. On the shaft 17 is fixed a beater knife 20 fast with a sleeve 21 fitted on the shaft.

The sleeve 21 and the knife or grinder 20 are removable and are housed in an infusion filter constituted by a bowl 22 the side wall of which engages and is closed by the body 13, the bottom of which is pierced with open small apertures forming a grid and having a bore at its central portion, in order to provide a passage therethrough of the shaft 18. The filter bowl 22 is closed at its upper end by a filter grid 23.

The filter bowl 22 and the filter grid 23 are fixed on the body 13, with the interposition of a sealing joint 24, by means of a lid 25 which is retained in the closed position by a half-hoop 26 (FIG. 3) fixed or pivoted on the body 13 and by a screw 27 passing through the hoop 26 and pressing on the said lid. On the lid 25 is fixed a tube 28 for pouring out the infusion.

The operation of the coffee-pot mill is as follows:

The motor 15 being placed in position in the body 13, below the coffee-mill, water is poured into the boiler 1 through the opening 5, after which the safety plug 6 is closed.

After the screws 27, lid 25 and the grid 23 are removed, the coffee beans are put into the filter bowl 22. The grid 23 and the lid 25 are then replaced in position and the screw 27 is again screwed down.

The device is connected to a source of current and the mill is started up, while at the same time the circuit of the resistance 4 is closed. The grinding of the coffee thus takes place while the water is being brought to the boil. The water, when heated, rises through the tube 11, insulated by the handle 10, and passes into the chamber 12 and into the filter bowl 22. Of course, during initial heating the grinding takes place, but after sufficient heating, the water rises and causes the ground coffee to swell, passes through it and is filtered by the grid 23, finally passing out through the pouring tube or spout 28.

A thermostat (not shown) provides an electrical protection means for the boiler.

The time required to prepare the coffee is about 6 minutes in all.

The coffee-pot and the mill are provided to make a given number of cups of coffee but the device is perfectly suitable for making a smaller number of cups. It is only necessary to reduce the quantity of coffee and water in proportion.

If it is desired to use the motor for other purposes (mixer, beater, etc.), it is sufficient to remove the motor from its housing and to fit on to its shaft the corresponding accessories.

FIG. 4 illustrates an alternative form of construction in which the parts of the coffee-pot mill are grouped close together.

To this end, the receptacle 1' is of annular shape and directly supports the bowl 22', being placed on a body 29, inside which is housed the motor 15' carried by a perforated plate 30 which is fixed on the said body.

The electric resistance 4' passes round the base of the boiler 1' and both the resistance and the motor are controlled by means of a switch 31.

Blocks 32 of rubber or other elastic material are employed to guide and centre the shaft 18' which carries the beater knife 20'.

In the bowl 22' is placed a first grid 33 while a filter grid 34 is provided above the knife 20'. Both of these grids are supported on the upper end 18'(a) of shaft 18 in conventional manner.

A lid 25' closes the bowl 22' and comprises a filtering strainer 35 forming a chamber therein together with the pouring spout 28' extending therefrom.

A sealing joint 36 is provided for the passage of the shaft 18', and joints 37 and 38 are inserted between the bowl 22' and the boiler 1' on the one hand, and between the bowl 22' and the lid 25' on the other. Joint 37 is a friction coupling and joint 38 is a seal. An insulating handle 39, mounted on a toggle fork 40 pivotally mounted on a lug 41 of the body 29, presses down the lid and lockingly retains the above-described parts in position.

A tube 10' housed in the boiler and terminating in the bowl 22' leads the water into this latter.

The operation of the alternative form of coffee-pot mill described above is the same as that indicated for the first form of embodiment of FIGS. 1 to 3.

What I claim is:

1. A combined coffee-pot and coffee-mill comprising, in a single structure, an electric boiler, an infusion bowl including a grid and intended to receive the coffee beans, a coffee-mill formed inside the infusion bowl by a beater knife mounted on a shaft passing through the bottom of the infusion bowl and its grid, an electric motor, means for detachably coupling the shaft of said motor to the shaft of the coffee-mill, a pipe forming a communication between said boiler and said infusion bowl, a grid forming a filter above the beater knife, a lid closing said infusion bowl for receiving the infusion made in said bowl, and a pouring tube formed in said lid to deliver the infusion to the exterior.

2. A combined coffee-pot and coffee-mill comprising a body, an electric boiler mounted on said body, an infusion bowl for receiving the coffee to be ground, a tube connecting said boiler and said infusion bowl, said tube extending to a point adjacent the bottom of said boiler, an electric motor housed in said body in juxtaposition to said boiler, an intermediate shaft coupled to the shaft of said motor and passing through the bottom of said bowl and through said grid, a beater knife removably mounted on said intermediate shaft, a filtering grid mounted in said infusion bowl above said beater knife, a lid mounted on and adapted to hermetically close said bowl, and a tube projecting from said lid for pouring out the coffee infusion.

3. A combined coffee-pot and coffee-mill comprising a body, an electric boiler mounted on said body, an infusion bowl for receiving the coffee to be ground, a tube connecting said boiler and said infusion bowl, said tube extending to a point near the bottom of said boiler, an electric motor housed in said body directly beneath said boiler, an intermediate shaft coupled to the shaft of said motor and passing through the bottom of said bowl and through said grid, a beater knife removably mounted on said intermediate shaft, a filtering grid mounted in said infusion bowl above said beater knife, a lid mounted on and adapted to hermetically close said bowl, and a tube formed in said lid for pouring out the coffee infusion.

4. A combined coffee-pot and coffee-mill comprising a hermetically sealable receptacle means for containing a liquid, means cooperating with said first containing means for heating water therein; bowl means having a closed side wall disposed in elevated relation with respect to said first liquid receptacle means; conduit means extending in communication between the lower portion of said receptacle means and the base portion of said bowl means; coffee grinding means including a grinding element secured thereon, means rotatably supporting said grinding element within said bowl means; motor means for driving said grinding means discharge conduit means spaced above and communicating with said bowl means; and filtering screen means disposed above said grinding element and in the communicating path between said discharge means and said bowl means.

5. A combined coffee-pot and coffee-mill as defined in claim 4 wherein said means for rotatably supporting said grinding element comprises a shaft and means supporting said shaft, motor means for rotating said shaft and grinding element thereon, and means detachably coupling said motor to said shaft, and single switch means simultaneously controlling said heating means and said motor means.

6. A combined coffee-pot and coffee-mill as defined in claim 4 wherein said bowl means has a foraminous base below said grinding element and said conduit means includes a reservoir chamber underlying said foraminous wall.

7. A combined coffee-pot and coffee-mill as defined in claim 4, having a detachable lid mounted above and closing said bowl means, said screen means being disposed between said lid and said bowl means.

8. A combined coffee-pot and coffee-mill as defined in claim 4 wherein all of said means are supported on a single base, and further including an insulated handle means for lifting and tilting said base to cause discharge of any coffee made in said pot and mill through said discharge means, said handle being extended between and in contact with said receptacle means and said bowl means.

9. A combined coffee-pot and coffee-mill as defined in claim 8 wherein said conduit means extends through the length of said insulated handle means.

10. A combined coffee-pot and coffee-mill as defined in claim 9 wherein said bowl means is laterally offset and elevated with respect to said receptacle means, and wherein said motor is adapted to be disposed under said bowl means adjacent said receptacle means.

11. A combined coffee-pot and coffee-mill as defined in claim 4 further including a base housing adapted to receive said motor, and wherein said receptacle means is disposed vertically above and supported by said base housing, and said bowl means being disposed vertically above and supported by said receptacle means, said handle means retaining said lid in closed position on said bowl means.

12. A combined coffee-pot and coffee-mill as defined in claim 8 wherein said bowl means includes a detachable lid, and means journalling said shaft for rotation centrally of said receptacle means and said bowl means, and wherein said pot and mill further includes a handle having an arcuate top extension, and a toggle linkage coupling the lower end of said handle to said base whereby to cause said top extension to sealingly lock said lid on said bowl means.

13. A combined coffee-pot and coffee-mill as defined in claim 4 wherein a removable lid means is mounted on said bowl means in sealing relation thereto, said filtering screen means forming a chamber between said removable lid means and said bowl means, said discharge conduit means comprising a pouring spout mounted and extending from said lid, and means for securing said lid on said bowl means.

14. A combined coffee-pot and coffee-mill as defined in claim 4 wherein a removable lid is mounted on said bowl means in sealing relation thereto, said filtering screen means comprising a part of said lid and forming a chamber therein, said discharge conduit means comprising a pouring spout extending from said lid, handle means extending into engagement with said lid and including toggle means, said handle means lockingly retaining said lid on said bowl when said toggle means is actuated.

References Cited in the file of this patent

FOREIGN PATENTS 1,117,198    France _____ Feb. 20, 1956